US012762708B2

(12) United States Patent
Zhao et al.

(10) Patent No.: US 12,762,708 B2
(45) Date of Patent: Oct. 13, 2026

(54) IMAGE PROCESSING METHOD, IMAGE PROCESSING DEVICE, ELECTRONIC DEVICE, AND STORAGE MEDIUM

(71) Applicant: Zhuhai Pantum Electronics Co., Ltd., Zhuhai (CN)

(72) Inventors: Yinfa Zhao, Zhuhai (CN); Xingcai Zou, Zhuhai (CN); Yangxiao Ma, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 361 days.

(21) Appl. No.: 18/513,604

(22) Filed: Nov. 19, 2023

(65) Prior Publication Data

US 2024/0177321 A1 May 30, 2024

(30) Foreign Application Priority Data

Nov. 24, 2022 (CN) ........................ 202211486430.X

(51) Int. Cl.
*G06T 7/13* (2017.01)
*G06T 5/80* (2024.01)
*G06V 10/74* (2022.01)

(52) U.S. Cl.
CPC .................. *G06T 7/13* (2017.01); *G06T 5/80* (2024.01); *G06V 10/761* (2022.01); *G06T 2207/20044* (2013.01); *G06T 2207/20164* (2013.01)

(58) Field of Classification Search
CPC .................... G06V 10/761; G06T 5/80; G06T 2207/20164
See application file for complete search history.

(56) References Cited

U.S. PATENT DOCUMENTS

| | | | | |
|---|---|---|---|---|
| 10,331,966 | B1 * | 6/2019 | Pribble | G06V 10/25 |
| 2012/0163728 | A1 | 6/2012 | Sun et al. | |
| 2013/0182002 | A1 * | 7/2013 | Macciola | G06T 3/02 345/589 |
| 2017/0083762 | A1 * | 3/2017 | Segalovitz | G06V 30/40 |
| 2021/0097653 | A1 | 4/2021 | Xue et al. | |

FOREIGN PATENT DOCUMENTS

| | | | |
|---|---|---|---|
| CN | 109409366 | A | 3/2019 |
| CN | 111339846 | A | 6/2020 |
| CN | 114510192 | A | 5/2022 |

* cited by examiner

*Primary Examiner* — Raphael Schwartz
(74) *Attorney, Agent, or Firm* — Anova Law Group, PLLC

(57) ABSTRACT

An image processing method includes: performing key point detection on an image to-be-processed, to determine a plurality of key points in the image to-be-processed which are corner points in the image to-be-processed; determining at least one key point combination among the plurality of key points, wherein each of the at least one key point combination includes four key points used to define a quadrilateral object; in response to a key point combination selection instruction input by a user, determining a target key point combination in the at least one key point combination; and performing perspective distortion correction on a quadrilateral area defined by a quadrilateral object corresponding to the target key point combination on the image to-be-processed, to obtain a processed image.

19 Claims, 15 Drawing Sheets

IMAGE PROCESSING METHOD, IMAGE PROCESSING DEVICE, ELECTRONIC DEVICE, AND STORAGE MEDIUM

CROSS-REFERENCE TO RELATED APPLICATION

This application claims the priority of Chinese Patent Application No. 202211486430. X, filed on Nov. 24, 2022, the content of which is incorporated herein by reference in its entirety.

TECHNICAL FIELD

The present disclosure generally relates to the field of image processing and, more particularly, relates to an image processing method, an image processing device, an electronic device, and a storage medium.

BACKGROUND

An electronic device, such as a mobile phone, a tablet computer, a digital camera, a smart watch, smart glasses, etc., is usually equipped with a camera, and a user can use the camera on the electronic device to take pictures of a photographing target (such as a presentation, a whiteboard, a document, a sketch, a painting, etc.) to obtain a captured image that includes the photographing target. For ease of description, an area of a photographing target in the captured image is denoted as a "target area". Since the user's photographing scene is complex and diverse, the user cannot photograph at a suitable position or angle, resulting in many non-target areas in the captured image besides the target area. It can be understood that a non-target area is an area not needed by the user, and the non-target area in the captured image causes interference to the user. In addition, there may be distortions in the target area in the captured image, resulting in poor user experience.

To address the above problems, a solution in the existing technologies includes that: after the user completes the photographing, recognizing the target area in the captured image to obtain an identified area; and then correcting the identified area by a distortion correction method to obtain a corrected image.

However, the accuracy of target area recognition is low, resulting in a poor image correction effect.

SUMMARY

One aspect of the present disclosure provides an image processing method. The image processing method includes: performing key point detection on an image to-be-processed, to determine a plurality of key points in the image to-be-processed, where the plurality of key points are corner points in the image to-be-processed; determining at least one key point combination among the plurality of key points, where each of the at least one key point combination includes four key points and the four key points are used to define a quadrilateral object; in response to a key point combination selection instruction input by a user, determining a target key point combination in the at least one key point combination; and performing perspective distortion correction on a quadrilateral area defined by a quadrilateral object corresponding to the target key point combination on the image to-be-processed, to obtain a processed image.

Another aspect of the present disclosure provides an image processing method. The method includes: displaying perspective graphics of quadrilateral objects corresponding to N optimal key point combinations in a display interface, wherein the optimal key point combinations are key point combinations with a highest similarity to a rectangle and N≥1; and in response to a key point combination selection instruction triggered by a user in the perspective graphics of the quadrilateral objects, determining a target key point combination among the N optimal key point combinations.

Another aspect of the present disclosure provides a non-transitory computer-readable storage medium. The storage medium is configured to store a program; and when the program is executed, a device where the computer-readable storage medium is located is controlled to: perform key point detection on an image to-be-processed, to determine a plurality of key points in the image to-be-processed, wherein the plurality of key points are corner points in the image to-be-processed; determine at least one key point combination among the plurality of key points, wherein each of the at least one key point combination includes four key points and the four key points are used to define a quadrilateral object; in response to a key point combination selection instruction input by a user, determine a target key point combination in the at least one key point combination; and perform perspective distortion correction on a quadrilateral area defined by a quadrilateral object corresponding to the target key point combination on the image to-be-processed, to obtain a processed image.

In the present disclosure, the final recognition area may be determined based on the user's selection, which may improve the accuracy of recognition of the target area, thereby improving the correction effect of the image. Further, the method realizes the recognition of the target area through the interaction between the user and the device, which may enhance the interaction between the user and the device.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. The embodiments disclosed herein are exemplary only. Other applications, advantages, alternations, modifications, or equivalents to the disclosed embodiments are obvious to those skilled in the art and are intended to be encompassed within the scope of the present disclosure.

It should be noted that the terms used in the embodiments of the present disclosure are only for the purpose of describing specific embodiments, and are not intended to limit the scope of the present disclosure. As used in the embodiments of the present disclosure and the appended claims, the singular forms such as "a", "said" and "the" are also intended to include the plural forms unless the context clearly indicates otherwise.

Figure 1:
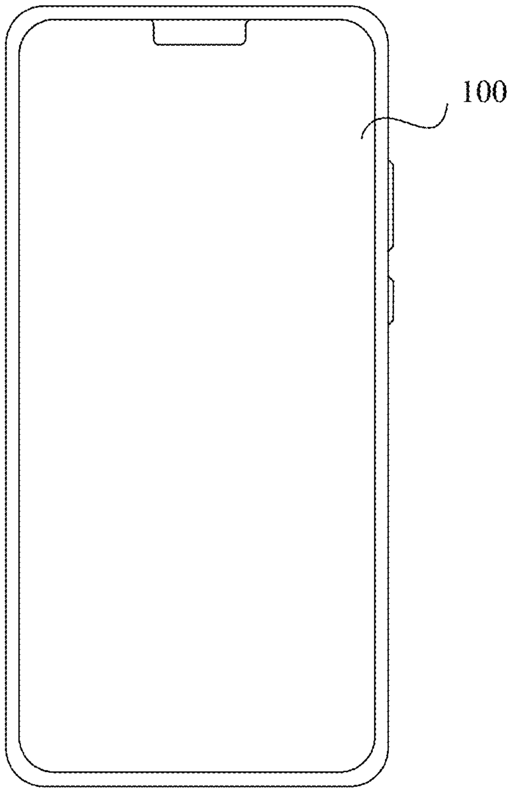
FIG. 1 illustrates an exemplary electronic device according to various disclosed embodiments of the present disclosure.

FIG. 1 is a schematic structural diagram of an electronic device provided by one embodiment of the present embodiment. The electronic device in the embodiment shown in FIG. 1 may be a mobile phone 100, that is, an image processing method provided by the present disclosure may be applied to the mobile phone 100. The embodiment shown in FIG. 1 where the electronic device is a mobile phone is used as an example to illustrate the present disclosure only, and does not limit the scope of the present disclosure. In various embodiments, in addition to the mobile phone 100, the electronic device may also be a tablet computer, a digital camera, a smart watch, smart glasses, etc., which are not specifically limited in the present disclosure.

In practical applications, a user may use a camera on the electronic device to photograph a photographing target (for example, a presentation, a whiteboard, a document, a sketch, a painting, etc.), to obtain a photographing image including the photographing target. For ease of description, the area of the photographing target in the captured image is denoted as a "target area". Since the user's photographing scene is complex and diverse, the user cannot photograph at a suitable position or angle, resulting in many non-target areas in the captured image besides the target area. It can be understood that a non-target area is an area not needed by the user, and the non-target area in the captured image may cause interference to the user. In addition, there may be distortions in the target area in the captured image, resulting in poor user experience.

Figure 2:
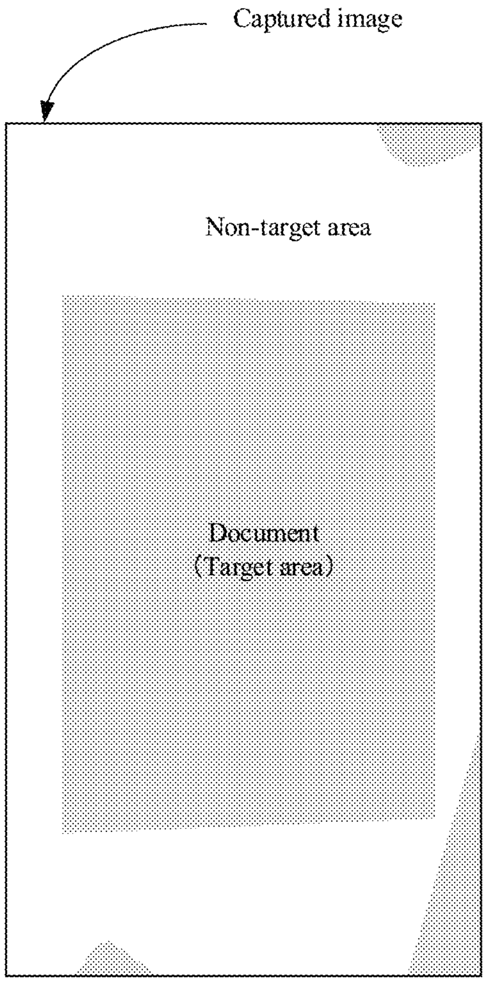
FIG. 2 illustrates an exemplary application scenario according to various disclosed embodiments of the present disclosure.

FIG. 2 illustrates an exemplary application scenario according to various disclosed embodiments of the present disclosure. In this application scenario, the photographing target is a document, that is, the user needs to photograph the document. However, because of factors including the shooting position and/or shooting angle of the user, in addition to the target area corresponding to the document, there are many non-target areas in the user's captured image. It can be understood that when the user views the document through the captured image, the non-target areas may cause disturbance to the user. In addition, the document in the captured image is distorted, resulting in a poor user experience.

To address the above problems, a solution in the existing technologies includes that: after the user completes the photographing, recognizing the target area in the captured image to obtain an identified area; and then correcting the identified area by a distortion correction method to obtain a corrected image. However, the accuracy of target area recognition is low, resulting in a poor image correction effect.

The present disclosure provides an image processing method, to at least partially alleviate the above problems. In the present disclosure, a plurality of key point combinations may be obtained by detecting an image to-be-processed (each key point combination may correspond to a recognition area). In response to a key point combination selection instruction input by a user, a target key point combination may be determined in the plurality of key point combinations. Subsequently, perspective distortion correction may be performed on one recognition area corresponding to the target key point combination to obtain a processed image. Since the method determines the final recognition area based on the user's selection, it may improve the accuracy of recognition of the target area, thereby improving the correction effect of the image. Further, the method realizes the recognition of the target area through the interaction between the user and the device, which may enhance the interaction between the user and the device. A detailed description will be given below in conjunction with the accompanying drawings.

Figure 3:
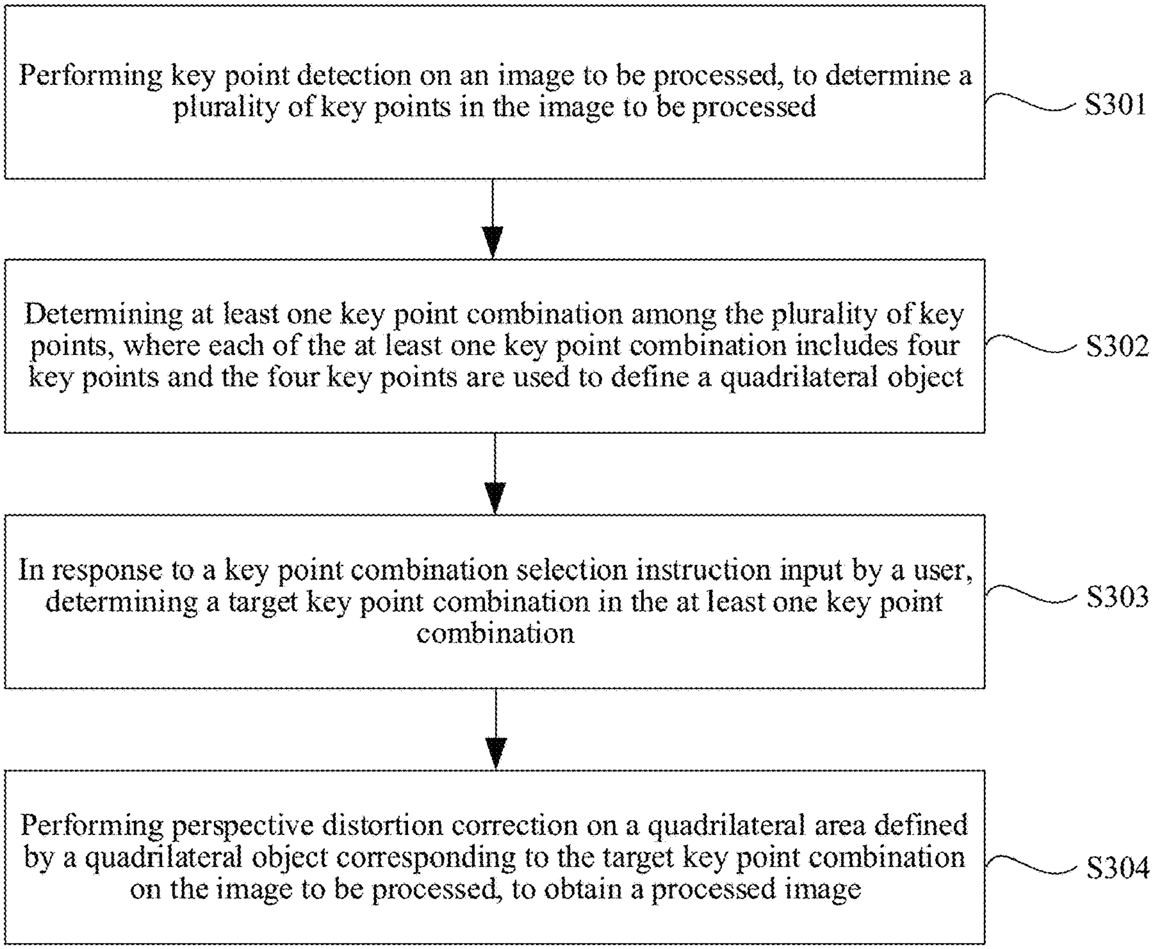
FIG. 3 illustrates a flowchart of an exemplary image processing method according to various disclosed embodiments of the present disclosure.

FIG. 3 illustrates a flowchart of an exemplary image processing method according to various disclosed embodiments of the present disclosure. The method may be applied to the electronic device shown in FIG. 1. The method may include S301 to S304.

In S301, key point detection may be performed on an image to-be-processed, to determine a plurality of key points in the image to-be-processed.

In one embodiment, the image to-be-processed may be a captured image, and the captured image may include a target area and a non-target area. The target area may be an area corresponding to the photographing target. For example, the target area may be an area corresponding to a presentation, a whiteboard, a document, a sketch, a painting, etc. in the captured image. The non-target area may be an area not required by the user, and may be usually located around the target area.

It can be understood that the photographing target such as a presentation, a whiteboard, a document, a sketch, a painting, etc., is usually rectangular, and the position of the photographing target in the captured image may be determined according to four corner points of the rectangle, such that the target area in the captured image is determined. Therefore, the corner points, that is, key points in the image to-be-processed may be detected first. The detection process of the key points will be described in detail below.

Figure 4:
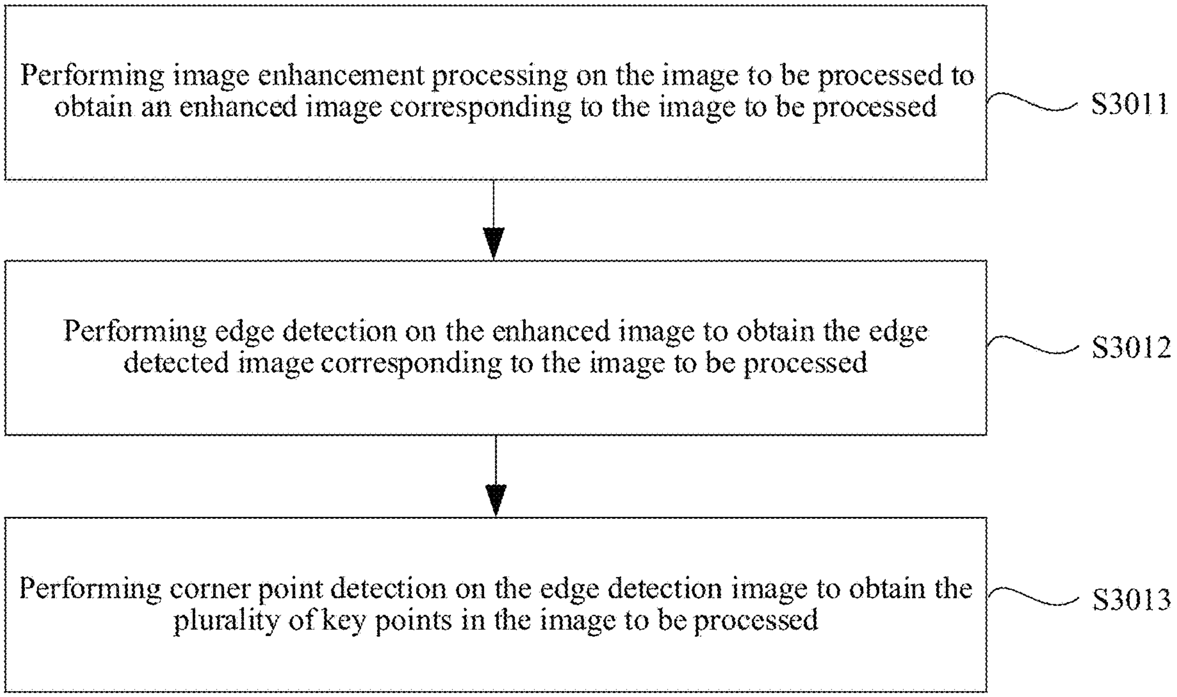
FIG. 4 illustrates a flowchart of an exemplary corner point detection method according to various disclosed embodiments of the present disclosure.

FIG. 4 illustrates a flowchart of an exemplary corner point detection method according to various disclosed embodiments of the present disclosure. As shown in FIG. 4, the method may include S3011 to S3013.

In S3011, image enhancement processing may be performed on the image to-be-processedto obtain an enhanced image corresponding to the image to-be-processed.

In one embodiment, firstly, image enhancement processing may be performed on the image to-be-processed, to improve the image quality and enrich the feature information in the image. By enhancing the image, a better key point detection effect may be obtained in subsequent processes.

In one embodiment, Gaussian filtering may be performed on the image to-be-processed to implement image enhancement. Specifically, an enhanced image corresponding to the image to-be-processed may be obtained by performing a filtering operation on the image to-be-processed through a filter kernel conforming to a two-dimensional Gaussian function. Exemplarily, the two-dimensional Gaussian function is:

$$(x, y) = Ae^{-\left(\frac{(x-x_0)^2}{2\sigma_x^2}+\frac{(y-y_0)^2}{2\sigma_y^2}\right)}, \tag{1}$$

where A is amplitude, $x_0$ and $y_0$ are the coordinates of the center point, and $\sigma_x^2$ and $\sigma_y^2$ are the variance. In one embodiment, the filter kernel may adopt a size of 3*3.

In some other embodiments, image enhancement processing may not be performed on the image to-be-processed, and S3012 and S3013 may be performed directly.

In S3012, edge detection may be performed on the enhanced image to obtain an edge detection image corresponding to the image to-be-processed.

In one embodiment, a canny algorithm may be used to perform edge detection on the enhanced image.

Specifically, the canny algorithm mainly includes the following steps.

1) The enhanced image may be gray-scaled.

In one embodiment, the following Eq. 2 or Eq. 3 may be used to grayscale the enhanced image, where Eq. 3 takes into account the physiological characteristics of the human eye.

$$\text{Gray} = (R+G+B)/3 \tag{2}$$

$$\text{Gray} = 0.299R + 0.587G + 0.114B \tag{3}$$

where Gray is the gray value, and R, G, and B are the brightness values corresponding to the red, green, and blue pixels respectively.

2) Gaussian filtering may be performed on the grayscale image.

In one embodiment, according to the weighted average of the gray value of the pixel to be filtered and its neighborhood points according to certain parameter rules, the high-frequency noise superimposed in the image may be effectively filtered out.

3) A gradient magnitude and direction may be calculated.

In one embodiment, selectable operators may include Sobel, Prewitt, Roberts, etc. The selected operators may be used to convolve with the input image to calculate dx and dy, and further the gradient magnitude of the image at a point (x, y), may be obtained by:

$$M(x, y) = \sqrt{d_x^2(x, y) + d_y^2(x, y)} \tag{4}$$

where M(x, y) is the gradient magnitude of the image at the point (x, y).

For simplification, the gradient magnitude of the image at a point (x, y) may be also calculated by:

$$M(x, y) = |d_x(x, y)| + |d_y(x, y)|. \tag{5}$$

The gradient direction of the image at a point (x, y) may be obtained by:

$$\theta_M = \arctan\left(\frac{d_y}{d_x}\right). \tag{6}$$

4) Non-maximum suppression may be performed on the gradient magnitude according to the gradient direction.

5) A double threshold algorithm may be used to detect and connect edges.

In one embodiment, a high threshold TH and a low threshold TL may be set. For example, TH=120 and TL=80. Points in the image that are smaller than the low threshold TL may be suppressed and assigned a value of 0; while points larger than the high threshold TH may be denoted as strong edge points and assigned a value of 255. Points that are larger than the low threshold TL and smaller than the high threshold TH may be denoted as weak edge points, and their assignment needs to be determined through connected regions. For example, when a weak edge point is connected to a strong edge point, the weak edge point may be assigned a value of 255.

It should be pointed out that in different application scenarios, those skilled in the art may adjust the values of the high threshold TH and the low threshold TL, which is not specifically limited in the present disclosure.

In S3013, corner point detection may be performed on the edge detection image to obtain the plurality of key points in the image to-be-processed.

In one embodiment, after edge detection is completed, corner point detection may be performed based on the edge detection image to obtain the plurality of key points, that is, corner points, in the image to-be-processed. After the corner point detection is completed, the detected corner points may be marked in the image to-be-processed and displayed to the user.

In one embodiment, the Harris algorithm may be used for the corner point detection, and the Harris algorithm mainly includes the following steps.

The image function may be I, pixel coordinates may be (x, y), slide variables of a sliding window may be (u, v). Therefore, a grayscale variation may be expressed as $$S(u, v) = \sum_u \sum_v \omega(x, y)(I(x+u, y+v) - I(x, y))^2, \quad (7)$$

where ω(x, y) is a weight function of the sliding window, and S(u, v) is the grayscale variation of the pixel point (x, y) in the sliding window.

Eq. 7 may be transformed to:

$$S(u, v) \approx [u, v] \sum_u \sum_v \omega(x, y) \begin{bmatrix} I_x(x, y)^2 & I_x(x, y) I_y(x, y) \\ I_x(x, y) I_y(x, y) & I_y(x, y)^2 \end{bmatrix} \begin{bmatrix} u \\ v \end{bmatrix}, \quad (8)$$

where the gradient covariance matrix is $$M = \sum_u \sum_v \omega(x, y) \begin{bmatrix} I_x(x, y)^2 & I_x(x, y) I_y(x, y) \\ I_x(x, y) I_y(x, y) & I_y(x, y)^2 \end{bmatrix} = \begin{bmatrix} A & C \\ C & B \end{bmatrix}. \quad (9)$$

A response function may be defined according to Eq. (9) as:

$$R + \det M - k\ (\mathrm{trace} M)^2, \quad (10)$$

where $\det M = \lambda_1 \lambda_2 = AC - B$, $\mathrm{trace} M = \lambda_1 + \lambda_2 = A + C$, $\lambda_1$ and $\lambda_2$ are the eigenvectors of the gradient covariance matrix M, k is a constant weight coefficient and may take a value of 0.02-0.04 based on experience. When R is greater than a set first threshold (that is, R is larger), it may be determined as a corner point. When R<0, it may be determined as an edge. When |R| is smaller than the set second threshold (that is, R is small), it may be determined as a smooth area.

In S302, at least one key point combination may be determined among the plurality of key points, and each key point combination may include four key points where the four key points are used to define a quadrilateral object.

Since presentations, whiteboards, documents, sketches, paintings, or other photographing objects are usually rectangular, and a rectangle includes four corner points, in one embodiment, each key point combination may be configured to include four key points, and the four key points may be used to define a quadrilateral object.

In one embodiment, some of the key points detected in S301 may be obviously wrong or abnormal key points. For the convenience of explanation, this part of the key points is denoted as "suspicious key points". It can be understood that the accuracy of identifying the target area may be reduced when the suspicious key points are used to establish the key point combinations. Therefore, in one embodiment. The key points may be screened first to eliminate the suspicious key points and obtains a plurality of reserved key points (key points after removing the suspicious key points). Subsequently, the at least one key point combination may be determined among the plurality of reserved key points.

It can be understood that in a small area of the image to-be-processed, there may be usually only one corner point in the target area. When there is a plurality of key points that are close in the image to-be-processed, one key point in the plurality of key points that are close may be used as a reserved key point, and other key points in the plurality of key points that are close may be removed as the suspicious key points to improve the accuracy of target area recognition.

In one embodiment, the probability of one key point being a corner point of the target area may be determined by the variance of the key point within a certain distance range. When the variance of the key point within the certain distance range is larger, its probability of being a corner point of the target area may be larger. When the variance of the key point within the certain distance range is smaller, its probability of being a corner point of the target area may be smaller. Therefore, among the plurality of key points, key points with the largest variance among the plurality of key points that are close may be determined as the reserved key points, and other key points among the plurality of key points that are close may be removed as suspicious key points. In one embodiment, the distance between any two key points in the plurality of key points may be calculated separately. When the distance between a first key point and a second key point is less than or equal to a first distance threshold, the variance of the first key point and the second key point within a second distance range may be calculated respectively. When the variance of the first key point is larger than the variance of the second key point, the second key point may be removed as a suspicious key point. When the variance of the first key point is smaller than the variance of the second key point, the first key point may be removed as a suspicious key point. When the variance of the first key point is equal to the variance of the second key point, the first key point or the second key point may be removed as a suspicious key point. Exemplarily, the distance between a key point A and a key point B among the plurality of key points may be calculated. When the distance between the key point A and the key point B is less than 50 pixels (the first distance threshold), the key point A and the key point B may be key points with a relatively short distance. Then the variance of the key point A and the variance of the key point B within a range of 10 pixels (a circle with a radius of 10 pixels, the second distance range) may be calculated respectively. One key point of the key point A and the key point B with a large variance may be determined as a reserved key point; while another key point of the key point A and the key point B with a smaller variance may be removed as a suspicious key point. When the variance of the key point A and the variance of the key point B is the same, any one may be selected as a reserved key point.

Figure 5:
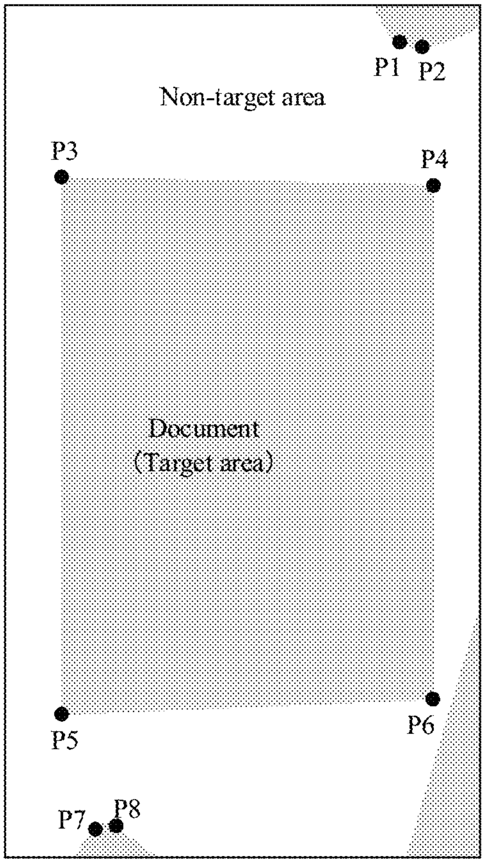
FIG. 5 illustrates a schematic diagram of reserved key points detected in the application scenario in FIG. 2, according to various disclosed embodiments of the present disclosure.

FIG. 5 illustrates a schematic diagram of reserved key points detected in the application scenario in FIG. 2, according to various disclosed embodiments of the present disclosure. As shown in FIG. 5, in the application scenario shown in FIG. 2, a total of 8 reserved key points, namely P1~P8, may be obtained. In subsequent steps, the key point combinations may be determined according to the eight reserved key points. It should be pointed out that the specific parameters of the first distance threshold and the second distance range may be adaptively adjusted according to actual application scenarios, which are not specifically limited in the present disclosure.

After completing the key point screening, at least one key point combination may be determined among the plurality of reserved key points. Assuming that the number of the plurality of reserved key points is P, since each key point combination includes 4 key points, a total of $C_P^4$ key point combinations may be determined from the P reserved key points. The number of key point combinations may be large. Exemplarily, when P=8 in the application scenario shown in FIG. 5, $C_P^4=70$, that is, there may be 70 key point combinations in total.

To further improve the user experience and the accuracy of the target area recognition, in one embodiment, N optimal key point combinations among the plurality of reserved key points may be determined, where N≥1. The quality of one key point combination may be determined by the similarity between the key point combination and the rectangle. That is, when the similarity between the quadrilateral object corresponding to the key point combination and the rectangle is higher, it may be more likely that the quadrilateral object is the target area. In one embodiment, the similarity value simi between each key point combination and the rectangle may be calculated respectively according to:

$$simi = \frac{360^\circ - \sum |90^\circ - \theta_i|}{360^\circ}, \tag{11}$$

where $\theta_i \in [0°, 180°$ the angle of the i-th angle in the quadrilateral object corresponding to the key point combination with $1 \le i \le 4$. N key point combinations with the largest similarity value simi to the rectangle may be determined as the optimal key point combinations.

The value range of simi may be [0, 1]. When the quadrilateral object corresponding to the key point combination is a rectangle, the value of simi is 1; and when the four key points corresponding to the key point combination are on the same straight line, the value of simi is 0.

Figure 6:
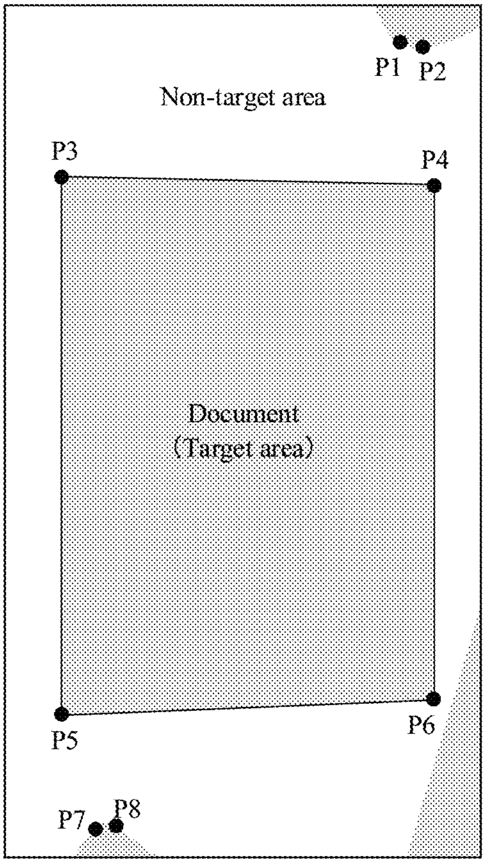
FIG. 6 illustrates a schematic diagram of key point combinations determined in the application scenario in FIG. 2, according to various disclosed embodiments of the present disclosure.

FIG. 6 illustrates a schematic diagram of key point combinations determined in the application scenario in FIG. 2, according to various disclosed embodiments of the present disclosure. As shown in FIG. 6, a quadrilateral object corresponding to the key point combination P3, P4, P5, and P6 is the quadrilateral P3P4P5P6. To calculate the similarity between the quadrilateral P3P4P5P6 and the rectangle, it may be first necessary to calculate the angle values of the four angles ∠P4P3P5, ∠P3P4P6, ∠P3P5P6, and ∠P4P6P5 according to the relative positions between the key points P3, P4, P5, and P6. And then the four angle values may be substituted into Eq. 11 to calculate the simi value corresponding to the key point combination P3, P4, P5, and P6. The N optimal key point combinations may be the N key point combinations with the largest simi values.

In S303, a target key point combination may be determined among the at least one key point combination in response to a key point combination selection instruction input by a user.

In one embodiment, after the at least one key point combination is determined among the plurality of key point combinations, the user may trigger a key point combination selection instruction, and then determine the target key point combination among the at least one key point combination. It can be understood that when the N optimal key point combinations are determined among the plurality of reserved key points in the above process, the user may select the target key point combination from the N optimal key point combinations.

To facilitate the user's selection of the target key point combination, in one embodiment, the perspective graphics of the quadrilateral objects corresponding to some or all of the N optimal key point combinations may be displayed on a display interface, and the user may trigger the key point combination selection instruction in the perspective graphics to determine the target key point combination among the N optimal key point combinations. For example, the user may trigger the key point combination selection instruction through a touch screen, a button, or a voice command, and the embodiment of the present application does not specifically limit the triggering method of the key point combination selection instruction.

In one embodiment, the image to-be-processed and the thumbnails of the perspective graphics of the quadrilateral objects corresponding to the optimal key point combinations may be displayed on the display interface. It can be understood that, to provide the user with a better visual experience, the images to be processed and the thumbnails should not overlap in the display interface. Exemplarily, the thumbnail may be located at the top, bottom, left and/or right of the image to-be-processed, etc., which is not specifically limited in the present disclosure. In one embodiment, limited by the size of the display interface, only partial thumbnails corresponding to the N optimal key point combinations may be displayed on the display interface. In addition, to facilitate selection by the user, the thumbnails displayed on the display interface may be sorted according to the pros and cons of the corresponding key point combinations. Exemplarily, the thumbnails in the display interface are sorted according to the simi values, and the simi values of key point combinations corresponding to the thumbnails gradually decrease from top to bottom.

Figure 7:
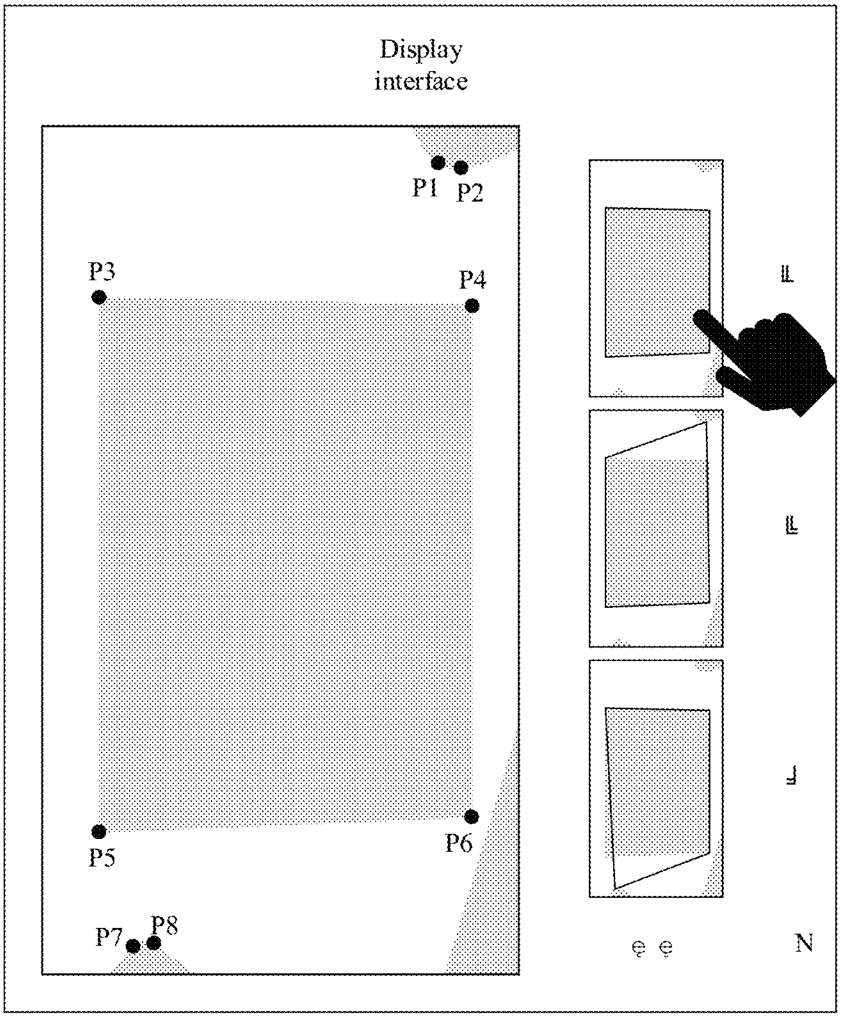
FIG. 7 illustrates another exemplary application scenario according to various disclosed embodiments of the present disclosure.

As shown in FIG. 7 which is another application scenario provided by one embodiment of the present disclosure, the image to-be-processed may be displayed on the display interface, and the three thumbnails corresponding to the N optimal key point combinations may be displayed on the right side of the image to-be-processed. The thumbnails ①, thumbnail ②, and thumbnail ③ may be arranged sequentially from top to bottom. The thumbnail ① may be the thumbnail corresponding to the key point combinationP3, P4, P5, and P6; the thumbnail ② may be the thumbnail corresponding to the key point combination P3, P2, P5, and P6; the thumbnail ③ may be the thumbnail corresponding to the key point combination P3, P4, P5, and P7. The simi value of the key point combination P3, P4, P5, and P6 may be larger than the simi value of the key point combination P3, P2, P5, and P6. The simi value of the key point combination P3, P2, P5, P6 may be larger than the simi value of the key point combination P3, P4, P5, P7. The user may click on one thumbnail to select the corresponding key point combination as the target key point combination. For example, in FIG. 7, the user may click on the thumbnail ①, and the device may receive the key point combination selection instruction and determine the key point combinations P3, P4, P5, and P6 corresponding to the thumbnail ① as the target key point combination.

In one embodiment, the quadrilateral objects corresponding to some of the thumbnails displayed on the display interface may not be quadrilateral objects required by the user. For example, in FIG. 7, the quadrilateral objects corresponding to the thumbnails ①, the thumbnail ②, and the thumbnail ③ may not be the quadrilateral objects required by the user. Therefore, the user may trigger a thumbnail switch instruction to switch some or all of the thumbnails displayed in the display interface to thumbnails corresponding to other optimal key point combinations.

Figure 8:
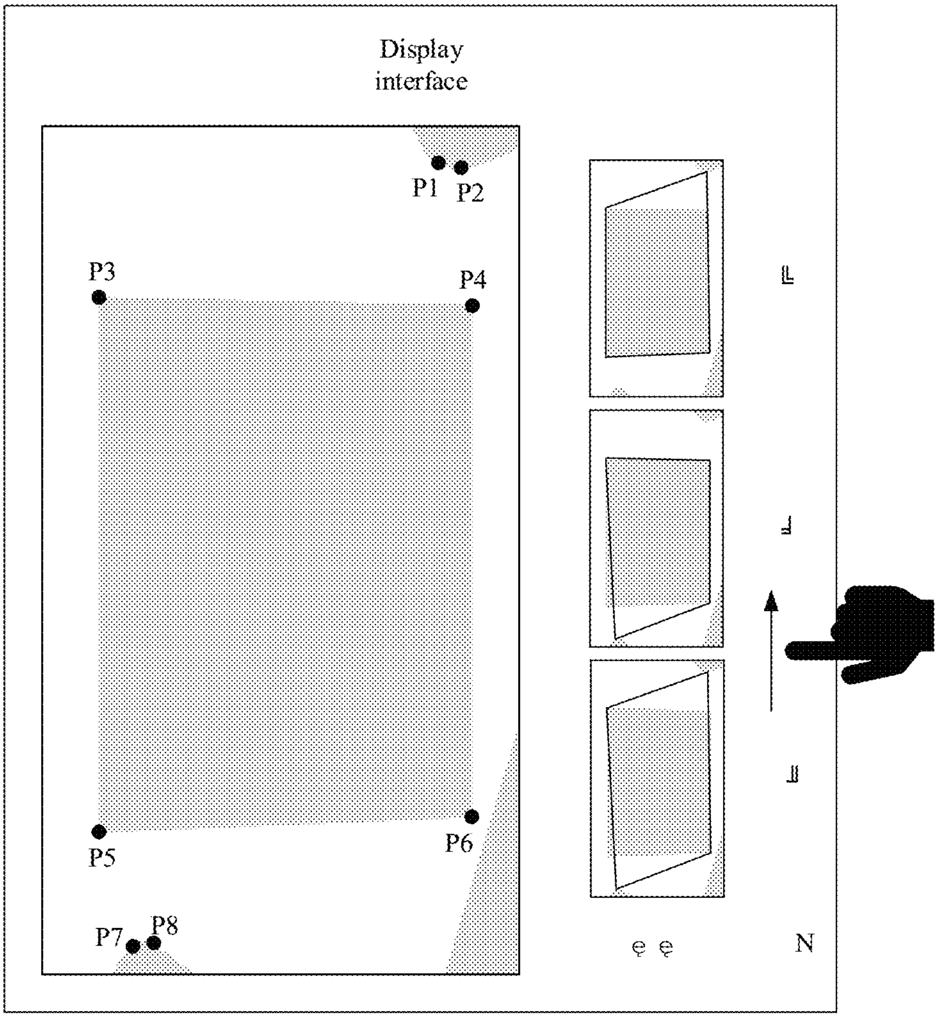
FIG. 8 illustrates another exemplary application scenario according to various disclosed embodiments of the present disclosure.

As shown in FIG. 8 which is another application scenario provided by one embodiment of the present disclosure, the user may switch the thumbnails displayed on the display interface from the thumbnail ①, the thumbnail ②, and the thumbnail ③ to the thumbnail ②, the thumbnail ③, and the thumbnail ④, by dragging the screen upwards. It should be pointed out that FIG. 8 is only an exemplary illustration of the embodiments of the present disclosure for description purposes only. In addition to the touch screen, the thumbnail switching instruction may also be triggered by buttons, voice instructions, and the like. In addition, the user may adjust the thumbnails in the display interface to other corresponding thumbnails in the N optimal key point combinations as required, which is not specifically limited in the present disclosure.

In another embodiment, the image to-be-processed and trigger controls corresponding to the optimal key point combinations may be displayed on the display interface, and a target perspective graphic may be displayed on the image to-be-processed. The target perspective graphic is a perspective graphic of a quadrilateral object corresponding to the optimal key point combination corresponding to the selected trigger control. It can be understood that, to provide users with better visual experience, the image to-be-processed and the trigger controls should not overlap in the display interface. Exemplarily, the trigger controls may be located at the top, bottom, left and/or right of the image to-be-processed, etc., which is not specifically limited in the present disclosure. In some embodiments, limited by the size of the display interface, only part of the trigger controls corresponding to the N optimal key point combinations may be displayed on the display interface. Further, for the convenience of the user to select, the trigger controls displayed on the display interface may be sorted according to the pros and cons of the corresponding key point combinations. Exemplarily, the trigger controls in the display interface may be sorted according to the corresponding simi values, and the simi values of the key point combinations corresponding to the trigger controls may decrease gradually from top to bottom.

Figure 9:
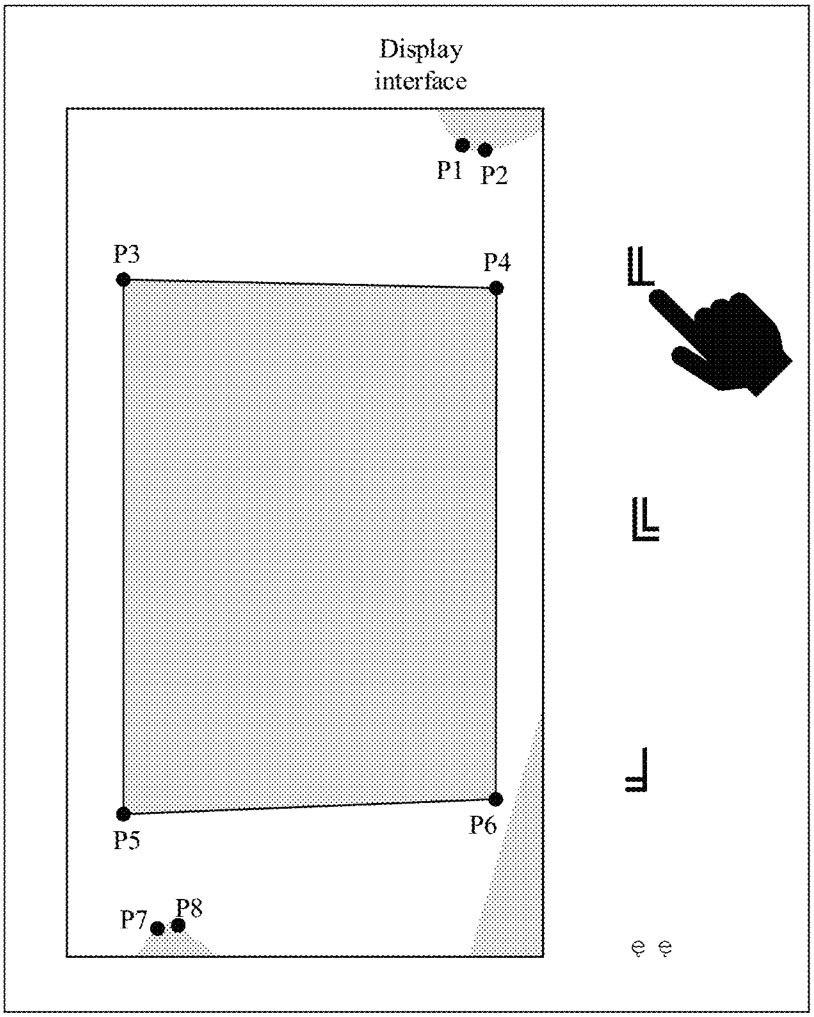
FIG. 9 illustrates another exemplary application scenario according to various disclosed embodiments of the present disclosure.

As shown in FIG. 9 which is another application scenario provided by one embodiment of the present disclosure, the image to-be-processed may be displayed on the display interface, and the three trigger controls corresponding to the N optimal key point combinations may be displayed on the right side of the image to-be-processed. The trigger control ①, trigger control ②, and trigger control ③ may be arranged in order from top to bottom. Among them, the trigger control ① may be the trigger control corresponding to the key point combination P3, P4, P5, and P6; the trigger control ② may be the trigger control corresponding to the key point combination P3, P2, P5, and P6; the trigger control ③ may be the trigger control corresponding to the key point combination P3, P4, P5, and P7. The simi value of the key point combination P3, P4, P5, P6 may be larger than the simi value of the key point combination P3, P2, P5, P6, and the simi value of the key point combination P3, P2, P5, P6 may be larger than the simi value of the key point combination P3, P4, P5, P7. The user may click one trigger control (that is, put the trigger control in the selected state), to display the perspective graphics of the quadrilateral object of the optimal key point combination corresponding to the selected trigger control on the image to-be-processed, that is, the target perspective image. For example, in FIG. 9, the user may click the trigger control ①, and the perspective graphics of the quadrilateral object corresponding to the optimal key point combination corresponding to the trigger control ①, that is, the perspective graphics corresponding to the key point combinations P3, P4, P5, and P6, may be displayed on the image to-be-processed for the user to view.

Figure 10:
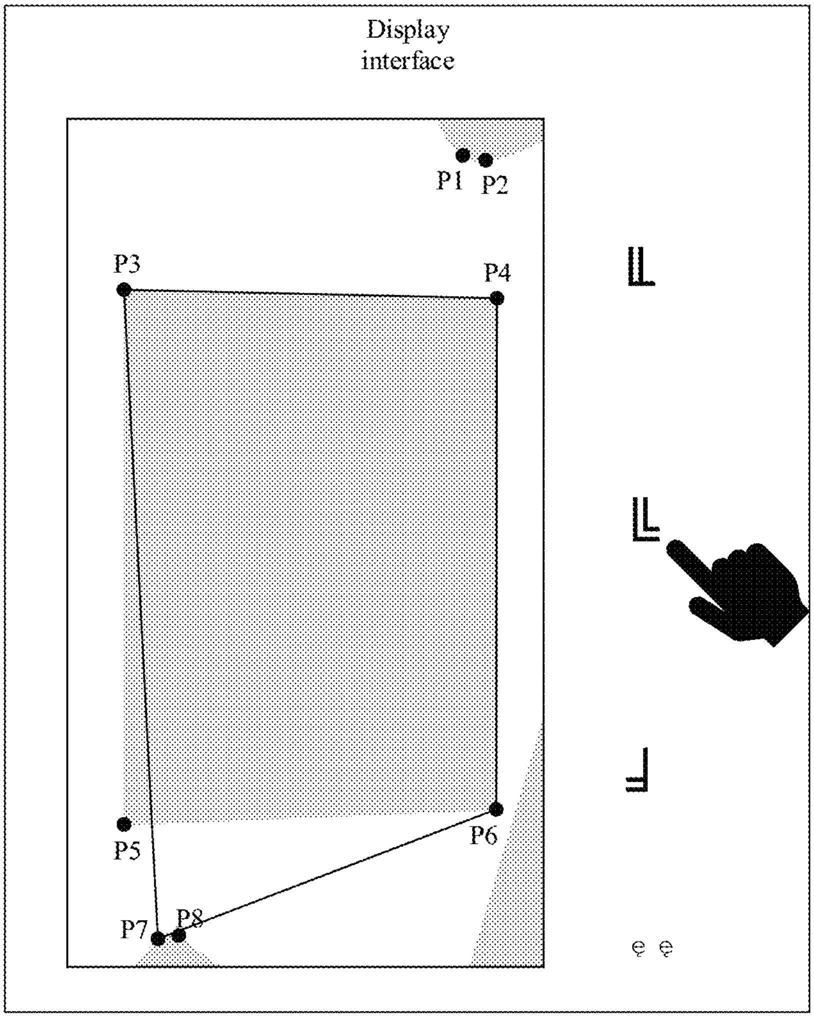
FIG. 10 illustrates another exemplary application scenario according to various disclosed embodiments of the present disclosure.

Further, when the user needs to view other perspective graphics, he may input a perspective graphics switching instruction, to switch the trigger control in the selected state, and then switch the target perspective graphics displayed on the image to-be-processed. For example, in FIG. 10, the user may click the trigger control ② to put the trigger control ② in the selected state. Correspondingly, the perspective graphics displayed on the image to-be-processed may be switched to the perspective graphics of the quadrilateral object of the optimal key point combination corresponding to the trigger control ②, that is, the perspective graphics corresponding to the key point combinations P3, P2, P5, and P6.

In one embodiment, the quadrilateral objects corresponding to some trigger controls displayed in the display interface may not be quadrilateral objects required by the user. For example, in FIG. 10, the quadrilateral objects corresponding to the trigger control ①, trigger control ②, and trigger control ③ are not the quadrilateral objects required by the user. At this time, the user may trigger the trigger control switching instruction to switch some or all of the trigger controls displayed in the display interface to trigger controls corresponding to other optimal key point combinations.

Figure 11:
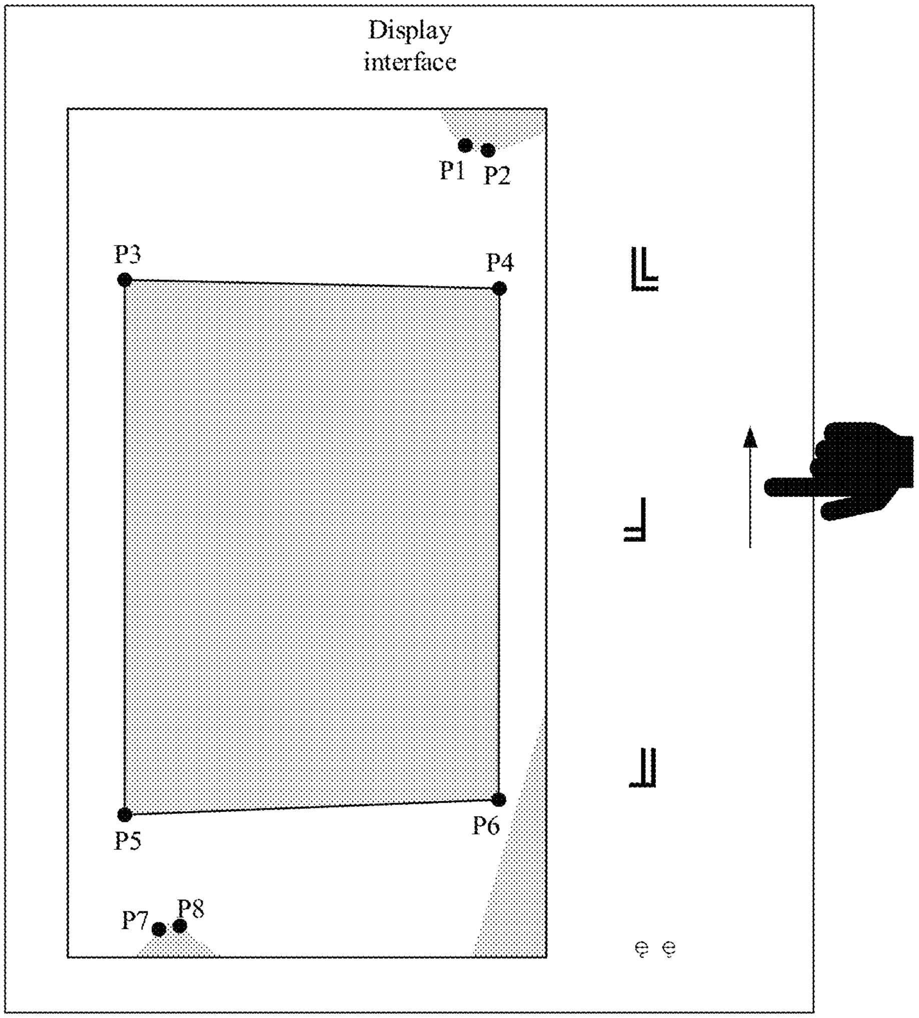
FIG. 11 illustrates another exemplary application scenario according to various disclosed embodiments of the present disclosure.

As shown in FIG. 11 which is another application scenario view, the user may switch the trigger controls on the display interface from the trigger control ①, trigger control ②, and trigger control ③ to the trigger control ②, trigger control ③, and trigger control ④ by dragging the screen upwards. It should be pointed out that FIG. 11 is only an exemplary illustration of the present disclosure. In addition to the touch screen, other trigger methods such as keys and voice commands may also be used to trigger the trigger control switching instruction. In addition, the user may adjust the trigger controls in the display interface to other trigger controls corresponding to the N optimal key point combinations as required, which is not specifically limited in the present disclosure.

In S304, perspective distortion correction may be performed on the quadrilateral area defined by the quadrilateral object corresponding to the target key point combination on the image to-be-processed, to obtain a processed image.

In one embodiment, the quadrilateral area defined by the quadrilateral object corresponding to the target key point combination on the image to-be-processed may be the final recognition area, and the processed image may be obtained by performing perspective distortion correction on the recognition area. Exemplarily, in the embodiment shown in FIG. 7, the determined target key point combination may be the key point combination P3, P4, P5, and P6. And then, perspective distortion correction may be performed on the quadrilateral area defined by the quadrilateral object corresponding to target key point combination P3, P4, P5, and P6, on the image to-be-processed, to obtain the processed image.

In one embodiment, since the final recognition region is determined based on the user's selection, the accuracy of recognition of the target region may be improved, thereby improving the correction effect of the image. Further, the method may realize the recognition of the target area through the interaction between the user and the device, which may enhance the interaction between the user and the device.

In another embodiment, to improve user experience, a default key point combination may also be determined from the plurality of key points. The default key point combination may include four default key points, and the four default key points may be used to define a quadrilateral object. Perspective distortion correction may be performed on the quadrilateral area defined by the quadrilateral object corresponding to the default key point combination on the image to-be-processed, to obtain the processed image. Specifically, determining the default key point combination from the plurality of key points may include: calculating a distance between each key point of the plurality of key points and each of the four edge vertices of the image to-be-processed respectively; and determining key point closest to the edge vertex as the default key points corresponding to the edge vertex, to obtain the default key point combination including the four default key points. It should be pointed out that the distance between the default key points and the edge vertex should be less than or equal to the preset distance threshold. Those skilled in the art may adjust the distance threshold according to actual needs. To facilitate the distinction from other distance thresholds, this distance threshold is denoted as "the third distance threshold". In other words, even if a key point is the key point closest to the edge vertex, if the distance between the key point and the edge vertex is larger than the third distance threshold, the key point may not be used as a default key point of the edge vertex.

Figure 12A:
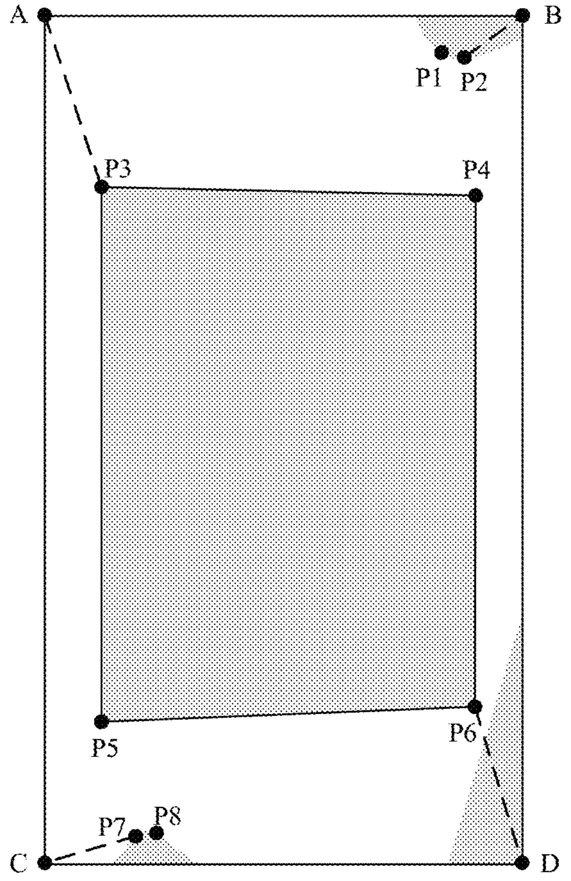
FIG. 12A illustrates another exemplary application scenario according to various disclosed embodiments of the present disclosure.
Figure 12B:
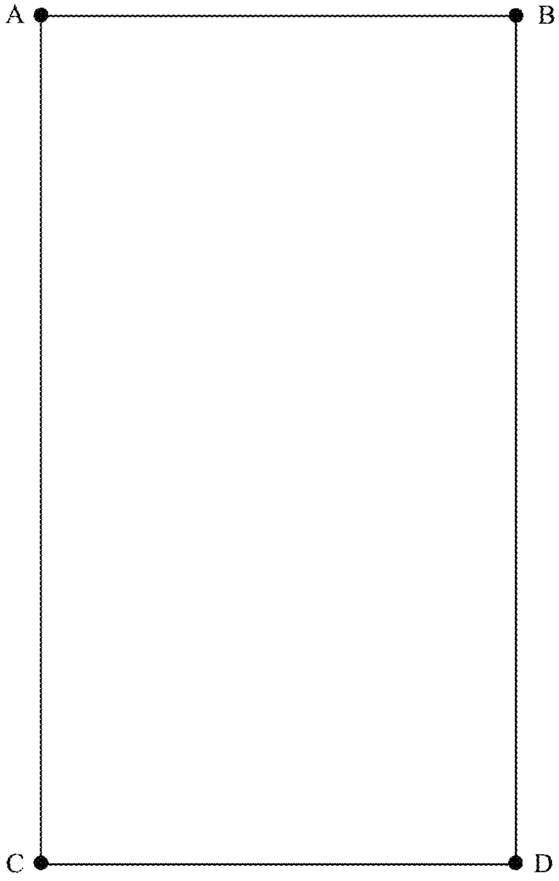
FIG. 12B illustrates another exemplary application scenario according to various disclosed embodiments of the present disclosure.

FIG. 12 illustrates another exemplary application scenario view, the four edge vertices of the image to-be-processed may be A, B, C, and D respectively. Distances between the key points P1~P8 and the edge vertices A, B, C, and D may be calculated respectively. For example, the distance between the key point P1 and the edge vertex A may be calculated according to:

$$d(P1, A) = \sqrt{(P1_x - A_x)^2 + (P1_y - A_y)^2}. \quad (12)$$

Similarly, the distances between the key points P1~P8 and the edge vertex A may be calculated respectively. By comparing the distances between the key points P1~P8 and the edge vertex A, it may be determined that the distance between the key point P3 and the edge vertex A is the shortest. Therefore, the key point P3 may be used as a default key point corresponding to the edge vertex A. Based on the same principle, the key point P2 may be used as a default key point corresponding to edge vertex B; the key point P7 may be used as a default key point corresponding to edge vertex C; and the key point P6 may be used as the default key point corresponding to edge vertex D. Therefore, the default key combination may be the key point combination P3, P2, P6, P7.

In some embodiments, some or all of the four edge vertices may not have corresponding default key points. For example, in the application scenario shown in FIG. 12B, if the image to-be-processed is a blank page, the key points cannot be detected when performing key point detection on the image to-be-processed in the above steps, and thus the default key points corresponding to the four edge vertices cannot be obtained according to the above method. For another example, in the application scenario shown in FIG. 12C, the key points P1-P8 may be all far away from the edge vertex A, that is, the distances between the key points P1-P8 and the edge vertex A may be all larger than the third distance threshold. Therefore, there may be no default key point corresponding to the edge vertex A.

Correspondingly, in one embodiment, when there is no corresponding default key point for any edge vertex among the four edge vertices, a recommended key point may be configured for the edge vertex, and the recommended key point may be used as the default key point for the edge vertex. In one embodiment, a certain distance may be offset from the edge vertex as the recommended key point of the edge vertex. That is, edge vertex coordinates+offset vector=recommended key point coordinates.

Figure 12C:
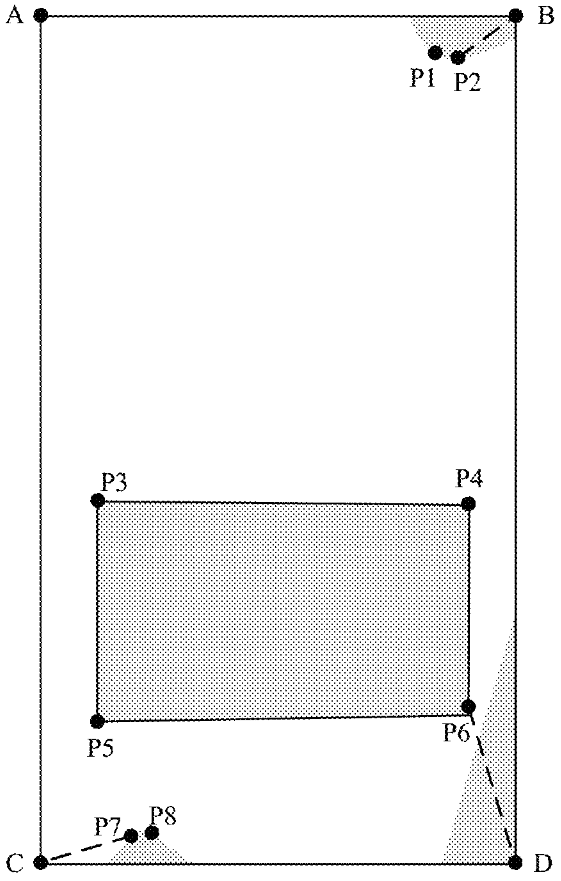
FIG. 12C illustrates another exemplary application scenario according to various disclosed embodiments of the present disclosure.

Exemplarily, in FIG. 12C, the coordinates of edge vertex A in the image to-be-processed are (0,0), and the offset vector is (offset, offset). Therefore, the recommended key point of edge vertex A may be (0+offset, 0+offset), where 0≤offset≤width, 0≤offset≤height, width and height represent the width and height of the image to-be-processed respectively. Exemplarily, when offset=10, the recommended key point of edge vertex A is (10,10). Those skilled in the art may set corresponding offset vectors according to actual needs, which is not specifically limited in the present disclosure.

The present disclosure also provides another image processing method.

Figure 13:
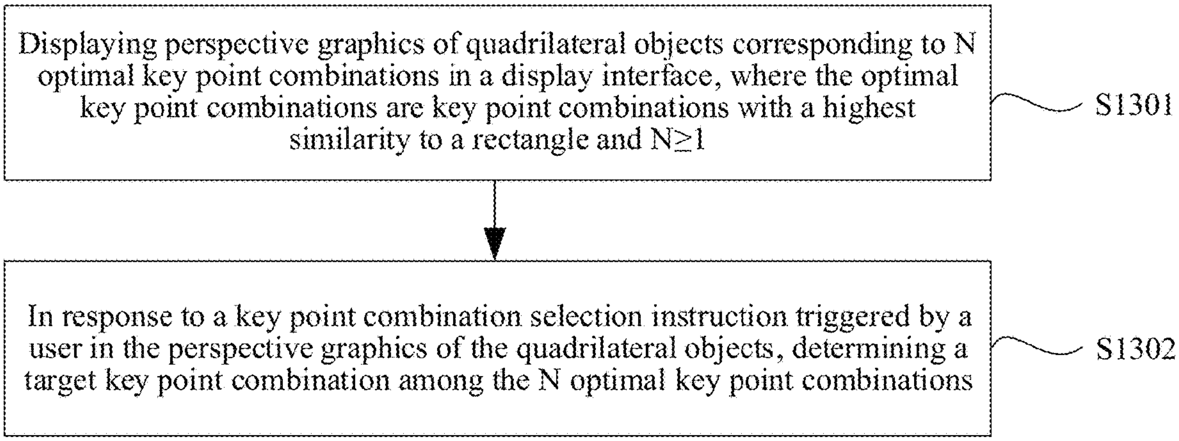
FIG. 13 illustrates a flowchart of another exemplary image processing method according to various disclosed embodiments of the present disclosure.

As shown in FIG. 13, the method may include:

S1301: displaying perspective graphics of the quadrilateral objects corresponding to the N optimal key point combinations on the display interface, where the optimal key point combinations are the key point combinations with the highest similarity to a rectangle and N≥1; and

S1302: in response to the key point combination selection instruction triggered by the user in the perspective graphic of the quadrilateral objects, determining the target key point combination among the N optimal key point combinations.

Figure 14:
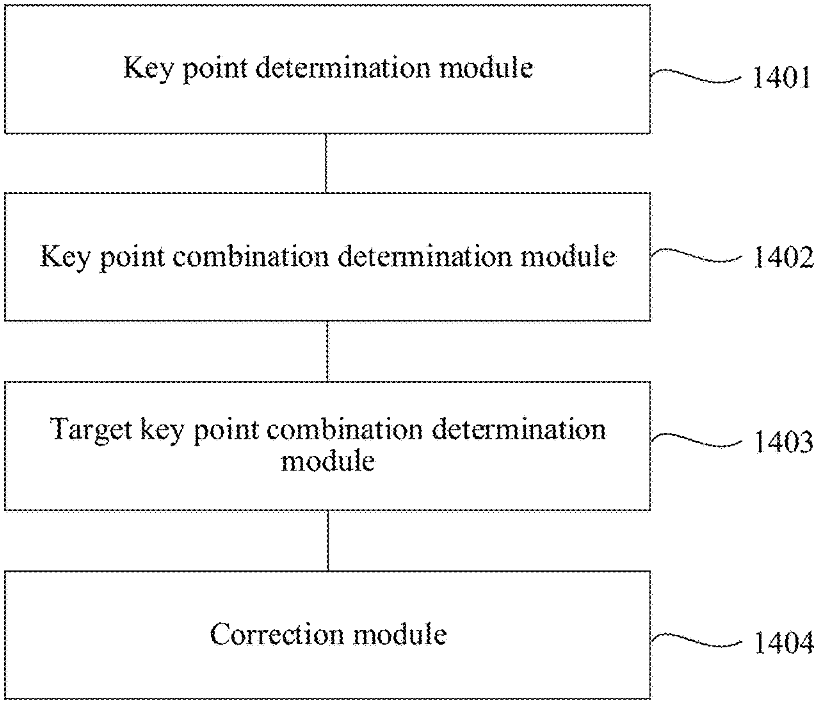
FIG. 14 illustrates an exemplary image processing device according to various disclosed embodiments of the present disclosure.

The present disclosure also provides an image processing device. As shown in FIG. 14, the image processing device may include:

a key point detection module 1401, configured to perform key point detection on the image to-be-processed to determine a plurality of key points in the image to-be-processed, where the plurality of key points are corner points in the image to-be-processed;

a key point combination determination module 1402, configured to determine at least one key point combination among the plurality of key points, where each of the at least one key point combinations includes four key points and the four key points are used to define a quadrilateral object;

a target key point combination determination module 1403, configured to determine a target key point combination in the at least one key point combination in respond to the key point combination selection instruction input by the user; and a correction module 1404, configured to perform perspective distortion correction on a quadrilateral area defined by a quadrilateral object corresponding to the target key point combination on the image to-be-processed, to obtain a processed image.

Figure 15:
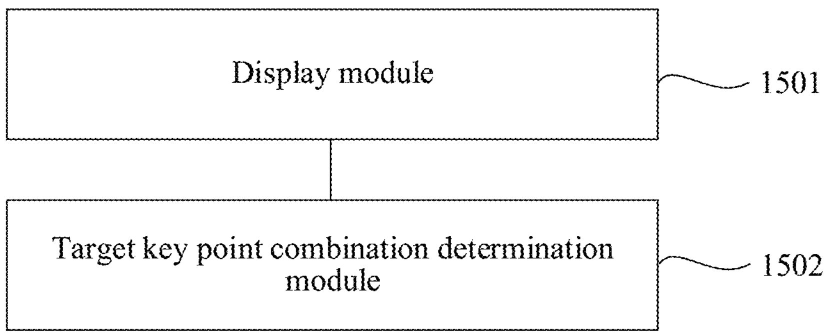
FIG. 15 illustrates another exemplary image processing device according to various disclosed embodiments of the present disclosure.

The present disclosure also provides another image processing device. As shown in FIG. 15, the image processing device may include:

a display module 1501, configured to display perspective graphics of the quadrilateral objects corresponding to the N optimal key point combinations on the display interface, where the optimal key point combinations are the key point combinations with the highest similarity to a rectangle and N≥1; and a target key point combination determination module 1502, configured to: in response to the key point combination selection instruction triggered by the user in the perspective graphic of the quadrilateral objects, determining the target key point combination among the N optimal key point combinations.

Figure 16:
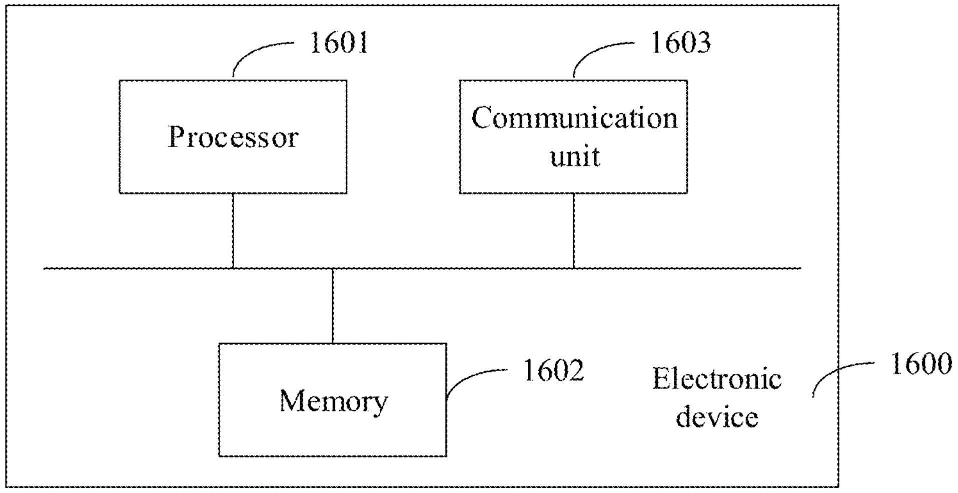
FIG. 16 illustrates an exemplary electronic device according to various disclosed embodiments of the present disclosure.

The present disclosure also provides an electronic device. As shown in FIG. 16, the electronic device 1600 may include a processor 1601, a memory 1602, and a communication unit 1603. These components may communicate through one or more buses. Those skilled in the art may understand that the structure of the electronic device shown in the figure does not constitute a limitation to the scope of the present disclosure. It can be a bus structure or a star structure, and it can also include more or less components than shown in the figure, or combine some components, or arrange different components.

The communication unit 1603 may be configured to establish a communication channel, so that the electronic device may be able to communicate with other devices.

The processor 1601 may be the control center of the electronic device, which uses various interfaces and lines to connect various parts of the entire electronic device, runs or executes software programs and/or modules stored in the memory 1602, and invokes data stored in the memory to perform various functions of the electronic device and/or process data. The processor may be composed of an integrated circuit (IC), for example, may be composed of a single packaged IC, or may be composed of multiple packaged ICs connected with the same function or different functions. For example, the processor 1601 may only include a central processing unit (central processing unit, CPU). In the embodiments of the present disclosure, the CPU may be a single computing core, or may include multiple computing cores.

The memory 1602 may be used to store the execution instructions of the processor 1601. The memory 1602 may be implemented by any type of volatile or non-volatile storage devices or their combination, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

When the execution instructions in the memory 1602 are executed by the processor 1601, the electronic device 1600 may be enabled to execute some or all of the method provided by the foregoing method embodiments.

The present disclosure further provides a computer-readable storage medium. The computer-readable storage medium may be configured to store a program. When the program is executed, the device where the computer-readable storage medium is located may be controlled to execute some or all of the methods provided by the foregoing method embodiments. The computer-readable storage medium may be a magnetic disk, an optical disk, a read-only memory (ROM), or a random access memory (RAM), etc.

The present disclosure further provides a computer program product. The computer program product may include executable instructions, and when the executable instructions are executed on a computer, the computer may execute some or all of the methods provided by the foregoing method embodiments.

The embodiments disclosed herein are exemplary only. Other applications, advantages, alternations, modifications, or equivalents to the disclosed embodiments are obvious to those skilled in the art and are intended to be encompassed within the scope of the present disclosure. In some cases, the actions or steps recited in the present disclosure may be performed in an order different from that in the embodiments and still achieve desirable results. In addition, the processes depicted in the accompanying figures do not necessarily require the particular order shown, or sequential order, to achieve desirable results. Multitasking and parallel processing may be also possible or may be advantageous in certain embodiments.

In the present disclosure, the terms including "one embodiment", "some embodiments", "example", "specific examples", or "some examples" mean that a particular feature, structure, material, or characteristic described in connection with the embodiments or examples may be included in at least one embodiment or example of the present disclosure. In the present disclosure, the schematic representations of the above terms are not necessarily directed to the same embodiment or example. Furthermore, the described specific features, structures, materials or characteristics may be combined in any suitable manner in any one or more embodiments or examples. In addition, those skilled in the art may combine different embodiments or examples and features of different embodiments or examples described in this specification without conflicting with each other.

The terms "first" and "second" are used for descriptive purposes only, and cannot be understood as indicating or implying relative importance or implicitly specifying the quantity of indicated technical features. Thus, the features defined as "first" and "second" may explicitly or implicitly include at least one of these features. In the present disclosure, "plurality" means at least two, such as two, three, etc., unless otherwise specifically defined.

Any process or method descriptions in flowcharts or otherwise described herein may be understood to represent modules, segments or portions of code comprising one or more executable instructions for implementing custom logical functions or steps of a process, and the scope of preferred embodiments of this specification includes alternative implementations in which functions may be performed out of the order shown or discussed, including in substantially simultaneous fashion or in reverse order depending on the functions involved.

Depending on the context, the word "if" as used herein may be interpreted as "at" or "when" or "in response to determining" or "in response to detecting". Similarly, depending on the context, the phrases "if determined" or "if detected (the stated condition or event)" could be interpreted as "when determined" or "in response to the determination" or "when detected (the stated condition or event)" or "in response to detection of (stated condition or event)".

In the present disclosure, the disclosed systems, devices or methods can be implemented in other ways. For example, the device embodiments described above are only illustrative. For example, the division of the units is only a logical function division. In actual implementation, there may be other division methods. For example, multiple units or components may be combined or may be integrated into another system, or some features may be ignored or not implemented. In another point, the mutual coupling or direct coupling or communication connection shown or discussed may be through some interfaces, and the indirect coupling or communication connection of devices or units may be in electrical, mechanical or other forms.

Each functional unit in each embodiment of the present disclosure may be integrated into one processing unit, or each unit may exist separately physically, or two or more units may be integrated into one unit. The above-mentioned integrated units can be implemented in the form of hardware, or in the form of hardware plus software functional units.

The integrated units implemented in the form of software functional units may be stored in a computer-readable storage medium. The above-mentioned software functional units may be stored in a storage medium, including several instructions to enable a computer device (which may be a personal computer, a connector, or a network device, etc.) or a processor to execute a portion of the methods described in each embodiment of the present disclosure. The aforementioned storage media may include medium that can store program code such as a flash disk, a mobile hard disk, read-only memory (ROM), random access memory (RAM), magnetic disk or optical disc, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

What is claimed is:

1. An image processing method, comprising:

performing key point detection on an image to-be-processed, to determine a plurality of key points in the image to-be-processed, wherein the plurality of key points are corner points in the image to-be-processed;

determining at least one key point combination among the plurality of key points, by performing:

removing suspicious key points from the plurality of key points to obtain a plurality of reserved key points, wherein the reserved key points are key points of the plurality of key points other than the suspicious key points; and determining the at least one key point combination among the plurality of reserved key points, wherein the determining of the at least one key point combination includes determining N optimal key point combinations among the plurality of reserved key points by performing:

calculating a similarity value simi between each key point combination of the plurality of reserved key points and the rectangle separately according to $simi=360°-\Sigma|90°-\theta_i|$, wherein $\theta_i \in [0°, 180°)$ is an angle of an i-th corner in a quadrilateral object 360° corresponding to the key point combination and $1 \le i \le 4$; and using N key point combinations with the largest similarity value simi to the rectangle as the optimal key point combinations, wherein the optimal key point combinations are key point combinations with the highest similarity to a rectangle and $N \ge 1$; and determining a target key point combination among the at least one key point combination in response to the key point combination selection instruction input by the user, wherein the determining of the target key point combination includes: determining the target key point combination among the N optimal key point combinations in response to the key point combination selection instruction input by the user, wherein each of the at least one key point combination includes four key points which are used to define a quadrilateral object;

performing one of: displaying the image to-be-processed and thumbnails of perspective graphics of quadrilateral objects corresponding to the at least one key point combination, the thumbnails not overlapping the image to-be-processed, and displaying the image to-be-processed and trigger controls corresponding to the at least one key point combination, the trigger controls not overlapping the image to-be-processed;

performing perspective distortion correction on a quadrilateral area defined by a quadrilateral object corresponding to the target key point combination on the image to-be-processed, to obtain a processed image.

2. The method according to claim 1, wherein performing the key point detection on the image to-be-processed to determine the plurality of key points in the image to-be-processed includes:

performing edge detection on the image to-be-processed to obtain an edge detection image corresponding to the image to-be-processed; and performing corner point detection on the edge detection image to obtain the plurality of key points in the image to-be-processed.

3. The method according to claim 2, wherein performing the edge detection on the image to-be-processed to obtain the edge detection image corresponding to the image to-be-processed includes:

performing image enhancement processing on the image to-be-processed to obtain an enhanced image corresponding to the image to-be-processed; and performing edge detection on the enhanced image to obtain the edge detected image corresponding to the image to-be-processed.

4. The method according to claim 1, wherein removing the suspicious key points from the plurality of key points to obtain the plurality of reserved key points includes:

using one key point of key points which are close to each other among the plurality of key points as a reserved key point, and removing other key points of the key points which are close to each other among the plurality of key points as the suspicious key points.

5. The method according to claim 4, wherein using one key point of the key points which are close to each other among the plurality of key points as a reserved key point, and removing other key points of the key points which are close to each other among the plurality of key points as the suspicious key points, include:

using one key point with a largest variance of the key points which are close to each other among the plurality of key points as the reserved key point, and removing other key points of the key points which are close to each other among the plurality of key points as the suspicious key points.

6. The method according to claim 5, wherein using the key point with the largest variance of the key points which are close to each other among the plurality of key points as the reserved key point, and removing other key points of the key points which are close to each other among the plurality of key points as the suspicious key points, include:

calculating distances between any two key points of the plurality of key points;

when a distance between a first key point and a second key point is less than or equal to a first distance threshold, calculating variance of the first key point and the second key point within a second distance range separately;

when the variance of the first key point is larger than the variance of the second key point, removing the second key point as a suspicious key point;

when the variance of the first key point is smaller than the variance of the second key point, removing the first key point as a suspicious key point; and when the variance of the first key point is equal to the variance of the second key point, removing the first key point or the second key point as a suspicious key point.

7. The method according to claim 1, wherein:

displaying the image to-be-processed and thumbnails of perspective graphics of quadrilateral objects corresponding to the at least one key point combination includes displaying thumbnails of perspective graphics of quadrilateral objects corresponding to the optimal key point combinations in a display interface; and determining the target key point combination among the optimal key point combinations in response to the key point combination selection instruction input by the user, includes: in response to the key point combination selection instruction triggered by the user in the thumbnails of perspective graphics of the quadrilateral objects, determining the target key point combination among the N optimal key point combinations.

8. The method according to claim 7, further comprising:

in response to a thumbnail switching instruction triggered by the user, switching some or all of the thumbnails displayed in the display interface to thumbnails of perspective graphics of quadrilateral objects corresponding to other optimal key point combinations.

9. The method according to claim 8, wherein the thumbnails in the display interface are sorted according to corresponding similarity values.

10. The method according to claim 1, wherein: displaying the image to-be-processed and trigger controls corresponding to the at least one key point combination includes:

displaying the image to-be-processed and trigger controls corresponding to the optimal key point combinations in a display interface, and displaying a target perspective graphic on the image to-be-processed, wherein:

the target perspective graphic is a perspective graphic of a quadrilateral object of one optimal key point combination corresponding to one trigger control in a selected state; and the image to-be-processed and the trigger controls do not overlap in the display interface.

11. The method according to claim 10, further comprising:

in response to a perspective graphic switching instruction triggered by the user, switching the trigger control in the selected state, to switch the perspective graphic displayed on the image to-be-processed.

12. The method according to claim 10, further comprising:

in response to a trigger control switching instruction triggered by the user, switching some or all of the trigger controls displayed in the display interface to other trigger controls corresponding to other optimal key point combinations.

13. The method according to claim 12, wherein the trigger controls in the display interface are sorted according to corresponding similarity values.

14. The method according to claim 1, further comprising:

determining a default key point combination among the plurality of key points, wherein the default key point combination includes four default key points and the four default key points are used to define a quadrilateral object; and performing perspective distortion correction on the quadrilateral area defined by the quadrilateral object corresponding to the default key point combination on the image to-be-processed, to obtain the processed image.

15. The method according to claim 14, wherein determining the default key point combination among the plurality of key points includes:

calculating a distance between each key point in the plurality of key points and each edge vertex of four edge vertices of the image to-be-processed respectively; and use one key point closest to each edge vertex as one default key point corresponding to the edge vertex, to obtain the default key point combination comprising the four default key points.

16. The method according to claim 15, wherein determining the default key point combination among the plurality of key points further includes:

when one edge vertex in the four edge vertices does not have a corresponding default key point, configuring a recommended key point for the edge vertex; and using the recommended key point as the default key point of the edge vertex.

17. The method according to claim 1, wherein the key point combination selection instruction input includes a touch screen input, a button input, or a voice command input.

18. An image processing method, comprising:

performing key point detection on an image to-be-processed, to determine a plurality of key points in the image to-be-processed, wherein the plurality of key points are corner points in the image to-be-processed;

removing suspicious key points from the plurality of key points to obtain a plurality of reserved key points, wherein the reserved key points are key points of the plurality of key points other than the suspicious key points; and determining N optimal key point combinations among the plurality of reserved key points by performing:

calculating a similarity value simi between each key point combination of the plurality of reserved key points and the rectangle separately according to $$simi = \frac{360° - \sum |90° - \theta_i|}{360°},$$

wherein $\theta_i \in [0°, 180°)$ is an angle of an i-th corner in a quadrilateral object corresponding to the key point combination and $1 \le i \le 4$; and using N key point combinations with the largest similarity value simi to the rectangle as the optimal key point combinations, wherein the optimal key point combinations are key point combinations with the highest similarity to a rectangle and N≥1; and determining a target key point combination among the N optimal key point combinations in response to the key point combination selection instruction input by the user, performing one of: displaying an image to-be-processed and thumbnails of perspective graphics of quadrilateral objects corresponding to N optimal key point combinations in a display interface, the image to-be-processed and the thumbnails not overlapping, and displaying the image to-be-processed and trigger controls corresponding to the N optimal key point combinations in the display interface, the image to-be-processed and the trigger controls not overlapping, wherein the N optimal key point combinations are key point combinations with a highest similarity to a rectangle, the key point combinations are determined from a plurality of key points in the image to-be-processed, each of the key point combinations includes four key points which are used to define a quadrilateral object.

19. A non-transitory computer-readable storage medium, wherein:

the computer-readable storage medium is configured to store a program; and when the program is executed, a device where the computer-readable storage medium is located is controlled to:

perform key point detection on an image to-be-processed, to determine a plurality of key points in the image to-be-processed, wherein the plurality of key points are corner points in the image to-be-processed;

determine at least one key point combination among the plurality of key points, by performing:

removing suspicious key points from the plurality of key points to obtain a plurality of reserved key points, wherein the reserved key points are key points of the plurality of key points other than the suspicious key points; and determining the at least one key point combination among the plurality of reserved key points, wherein the determining of the at least one key point combination includes determining N optimal key point combinations among the plurality of reserved key points by performing:

calculating a similarity value simi between each key point combination of the plurality of reserved key points and the rectangle separately according to $simi=360°-\Sigma|90°-\theta_i|$, wherein $\theta_i \in [0°, 180°)$ is an angle of an i-th corner in a quadrilateral object corresponding to the key point combination and $1 \leq i \leq 4$; and using N key point combinations with the largest similarity value simi to the rectangle as the optimal key point combinations, wherein the optimal key point combinations are key point combinations with the highest similarity to a rectangle and $N \geq 1$; and determining the target key point combination among the at least one key point combination in response to the key point combination selection instruction input by the user, includes: determining the target key point combination among the N optimal key point combinations in response to the key point combination selection instruction input by the user, wherein each of the at least one key point combination includes four key points and the four key points are used to define a quadrilateral object; and perform perspective distortion correction on a quadrilateral area defined by a quadrilateral object corresponding to the target key point combination on the image to-be-processed, to obtain a processed image.

* * * * *